(12) United States Patent
Pick et al.

(10) Patent No.: US 8,419,816 B2
(45) Date of Patent: Apr. 16, 2013

(54) GAS ISOLATION VALVE

(75) Inventors: Martin Pick, York (GB); Stephen Cash, North Yorkshire (GB)

(73) Assignee: Q-Flo Ltd., Cambridge (GB)

( * ) Notice: Subject to any disclaimer, the term of this patent is extended or adjusted under 35 U.S.C. 154(b) by 935 days.

(21) Appl. No.: 11/887,126

(22) PCT Filed: Mar. 21, 2006

(86) PCT No.: PCT/GB2006/001001
§ 371 (c)(1),
(2), (4) Date: Sep. 3, 2010

(87) PCT Pub. No.: WO2006/100456
PCT Pub. Date: Sep. 28, 2006

(65) Prior Publication Data
US 2010/0329939 A1    Dec. 30, 2010

(30) Foreign Application Priority Data
Mar. 23, 2005    (GB) .................................. 0506007.4

(51) Int. Cl.
*B01D 50/00*    (2006.01)

(52) U.S. Cl.
USPC ............ 55/319; 95/289; 95/57; 95/78; 96/15; 96/100; 96/221; 423/447.3; 423/447.1; 422/186.04; 422/129; 422/241; 422/110; 422/108; 422/111; 422/606; 422/109

(58) Field of Classification Search .................... 55/319; 95/289, 57, 78; 96/15–100, 221; 423/447.3, 423/447.1; 422/186.04, 129, 241, 110, 108, 422/111, 606, 109
See application file for complete search history.

(56) References Cited

U.S. PATENT DOCUMENTS 7,926,440 B1 * 4/2011 Tombler et al. ................ 118/59

* cited by examiner

*Primary Examiner* — Jason M Greene
*Assistant Examiner* — Dung H Bui
(74) *Attorney, Agent, or Firm* — Galgano & Associates, PLLC; Thomas M. Galgano; Jessica G. Bower

(57) ABSTRACT

Provided is a gas isolation valve which separates reactive materials, principally gases, contained in a high temperature reactor from the surrounding atmosphere. The valve is of modular construction with each module having a gas providing section and a gas removal section. Any number of modules can be provided in series. A central chamber, open at each end gives unimpeded access to the high temperature reactor. It is through the central chamber that the product of the reactor is removed and harvested. In the case of Ilas invention the product is carbon nanotubes.

19 Claims, 8 Drawing Sheets

GAS ISOLATION VALVE

Figure 1:
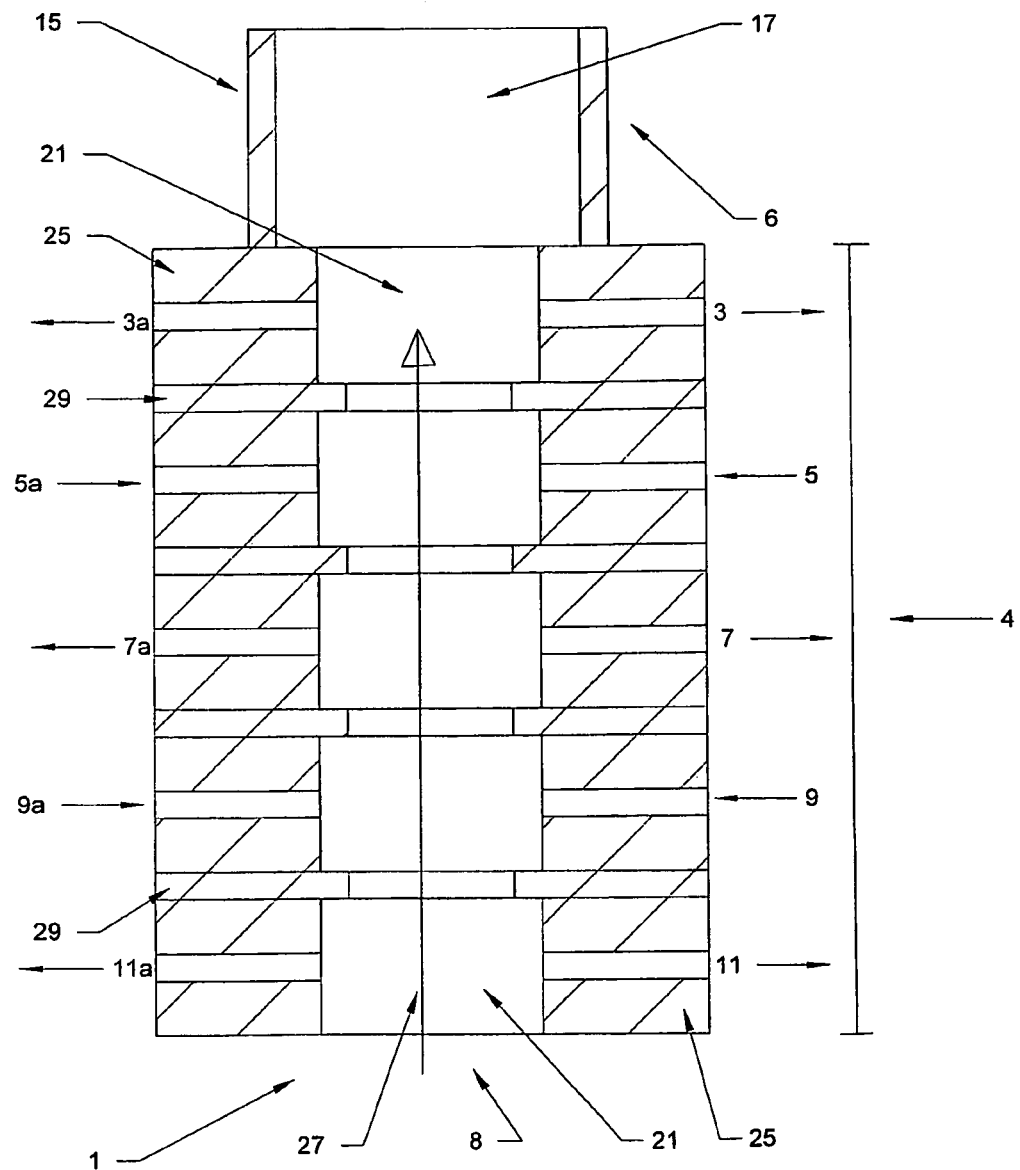

The latter part of the twentieth century witnessed the discovery of the carbon $C_{60}$ Buckminster Fullerine [H. W. Kroto, J. R. Heath, S. C. O'Brien, R. F. Curl and R. E. Smally, (Nature 318, 162 1985)]. Subsequent investigation of the properties of this new allotrope of carbon led to the identification of carbon nanotubes based on the $C_6$ molecular structure of carbon [S. Ijima Nature 354, 56 1991]. Typically carbon nanotubes have a diameter of 1.0-100 nanometres and aspect ratios ranging from <10/1 to >1000/1. They can be produced in a variety of forms exampled by single walled nanotubes [SWNT's], multiwalled nanotubes [MWNT's] and nanofibres. Nanotubes can be processed in a number of ways which make them suitable for different end uses. Vertically aligned carbon nanotubes are destined for electronics as they exhibit remarkable electrical properties, similarly fibre produced from nanotubes created in a high temperature gas reaction chamber can be used to create technically advanced materials. The technology surrounding the production of nanotube fibre is new and challenging and demands constant intellectual innovation. It is in the domain of technical challenge and problem solving that the described invention exists.

Typically a gas reaction vessel used to produce carbon nanotube fibre is a vertically mounted cylinder with an exampled aspect ratio of 8:1. The vessel has zones operating at different temperatures exampled by a high temperature, nanotube producing reaction zone, a transfer zone and an extraction zone. A carbon feedstock, exampled by methane and ethanol is introduced into the reaction vessel together with a carrier gas, exampled by argon, helium, nitrogen and hydrogen. The gases are not necessarily exclusive. For the purpose of this description the gas used is hydrogen. The feedstock and the carrier as are introduced into the upper high temperature reaction zone where nanotubes are produced. Initially a sock of nanotubes is formed which forms into fibre as the nanotubes travel through the reaction vessel transfer zone. When in the extraction zone thought must be given to effective harvesting of product outside the reaction vessel. The present invention addresses the problem of isolating the high temperature carrier gas within the reaction vessel from the outside atmosphere.

Consideration of available technologies has identified the set of gas valves known as labyrinth valves. Careful analysis of their design showed them to be unsuitable for fibre harvesting as they do not offer a straight line path for fibre extraction and the isolation of the reactive gases within the reaction chamber from atmospheric oxygen is not guaranteed. Prior art searching has not provided any suitable gas barrier system which can be applied to the present technology. The described invention provides a straight line chamber through which fibre can be extracted without impediment, complete gas isolation is ensured and the removal of reactive gases is ensured.

The isolation valve so described can be provided as a single piece or constructed in unit stackable, modular form. Each unit can be composed of two sections. If constructed in two sections section one is an evacuating chamber provided with a set of nozzles whilst section two provides a flushing gas introduced through its own set of nozzles. A gas tight seal is provided between each of the two sections and between each of the stackable units. The valve can have as many of the aforementioned, discrete, stackable isolation units as needed. If required an iris provision can be provided for each isolation unit such that the access aperture to the reaction vessel and/or each stackable unit can be set as required. For example only the present invention has the valve units mounted vertically and discretely in series. The traces of reactive gases within the reaction vessel are diminished progressively by each of the discrete, stackable units until no traces of the gases are present in the atmosphere at the base of the gas isolation valve. Sensors can be employed to sample the gases in the discrete stackable units to confirm complete removal.

The described invention allows unencumbered access between the reaction vessel and the atmosphere. The unencumbered access provides the means whereby the product of the reaction vessel, which for the purposes of this description is nanotube fibre, can be continuously harvested. The valve as described has a continuous, uninterrupted, open ended channel through which reaction vessel product is harvested. The channel can be iris controlled if required.

The aforementioned nozzles for flushing gas input and evacuation can vary in number and size. The angle of gas input can also be varied depending on the angle the nozzles present to the gas flushing chamber wall. Orthogonal presentation can provide benign input for the flushing gas whereas nozzles set at an angle to the gas flushing chamber walls can promote spin to the gas within the chamber, this can be advantageous in particular circumstances. Similarly the nozzles affecting the evacuation of gases from the isolation units can be set orthogonally or at an angle. The position of the nozzles can augment the characteristics of the gas flushing valve section and/or set up independent gas flow characteristics.

Although the stackable, gas isolation units are preferably metallic non-metallic versions, exampled by units made from ceramic materials can also be provided.

It may be advantageous for certain requirements that gas turbulence is introduced into the gas flushing chamber, this can be achieved by careful positioning of the nozzles in the chamber walls and/or varying the gas input pressure. A gradient of gas energies can be provided from unit to unit. The resultant gradient of energies can be used to increase the gas separation from discrete unit to discrete unit and thus from the reaction vessel to the atmosphere.

Similarly if each unit is at a different temperature from its neighbour a thermal gradient can also be introduced which further isolates the reactive gases within the reaction vessel from the oxygen of the atmosphere. A gas tight seal is provided between each stackable unit and also between the evacuation and flushing gas sections. If the seal is also an insulator then each stackable unit can be electrically isolated and an electric charge gradient can be applied to the stacked units further increasing the number of variables that can be used to aid product extraction and harvesting.

Experiments performed on the gas isolation valve as described have resulted in zero amounts of reactive gases being detected at the aperture that interfaces with the atmosphere where product is harvested.

According to the present invention there is provided a gas blanket isolation valve such that reactive gases and/or volatiles within a high temperature gas reaction vessel are isolated from the atmosphere at the base of the extraction valve. The high temperature gas reaction vessel produces product, which for the purposes of this description are carbon nanotubes that are harvested as carbon nanotube fibre. Although a single piece valve is possible the present description has a plurality of discrete units assembled in modular form. Each discrete unit is composed of sections and although there can be a plurality of sections the present description identifies two. Section one is an evacuation chamber provided within a metallic or non-metallic container. Section two is a flushing gas input chamber similarly housed within a metallic or non-metallic container. When assembled the stacked discrete units provide an unencumbered access channel through which carbon nanotube fibre can be extracted. Each of the evacuation and gas flushing sections has nozzles set into its wall. The nozzles can be orthogonally positioned or set at an angle. The evacuation section can have nozzles set at an angle in opposition to those in the gas flushing section if so required. The units are isolated from their neighbours by a gas tight gasket. The gas tight gasket can be electrically isolating if necessary. Gradients can be introduced to the stacked units exampled by kinetic energy, thermal energy and electric charge. Irises can be provided such that the aperture of each unit can be controlled. The control of the apertures can assist ventura extraction. Sensors can be placed at strategic points within the gas isolation valve such that measurements of reactive gases can be taken. In operation the gas flushing sections are provided with gas exampled by inert gases although any gas of choice can be used. There can be any number of units employed in the modular constructed, gas isolation blanket valve. The valve isolates the reactive gases within the aforementioned reaction vessel from the outside atmosphere by removing them from the channel that allows unimpeded extraction of reaction vessel product.

Capture of the product, which for the purposes of this description is carbon nanotube fibre can advantageously be made using a probe which can be inserted into the reaction vessel through the unimpeded chamber provided by the gas isolation blanket valve. This method of capture is for example only and other methods can be employed if so desired.

The following diagrams will be used to further describe the present invention.

FIG. 1. Shows the modular, unit stacked, gas blanket valve together with the high temperature reaction vessel.

Figure 2:
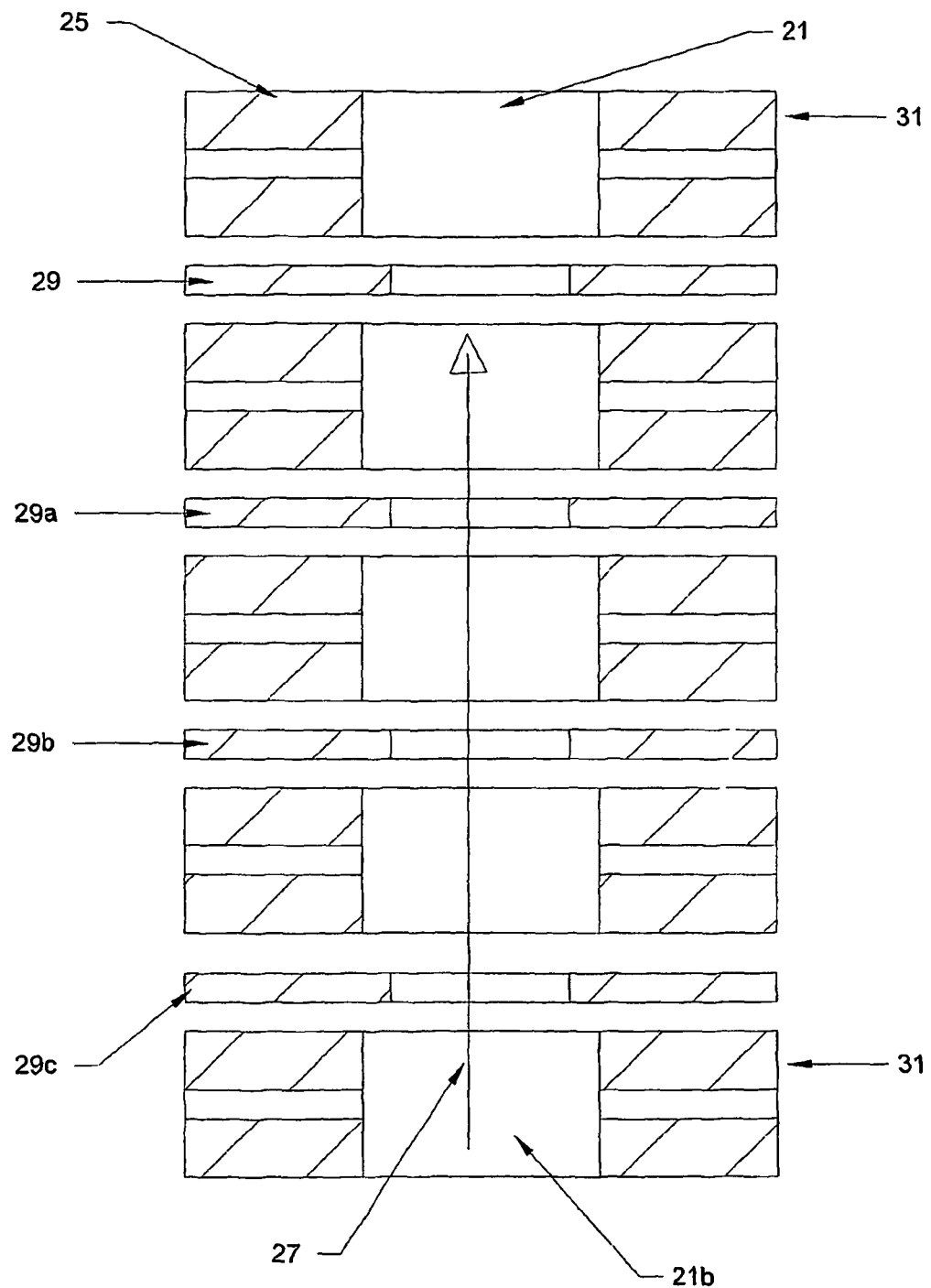

FIG. 2. Shows the modular, unit stacked, gas blanket valve together with the gas tight seal.

Figure 3:
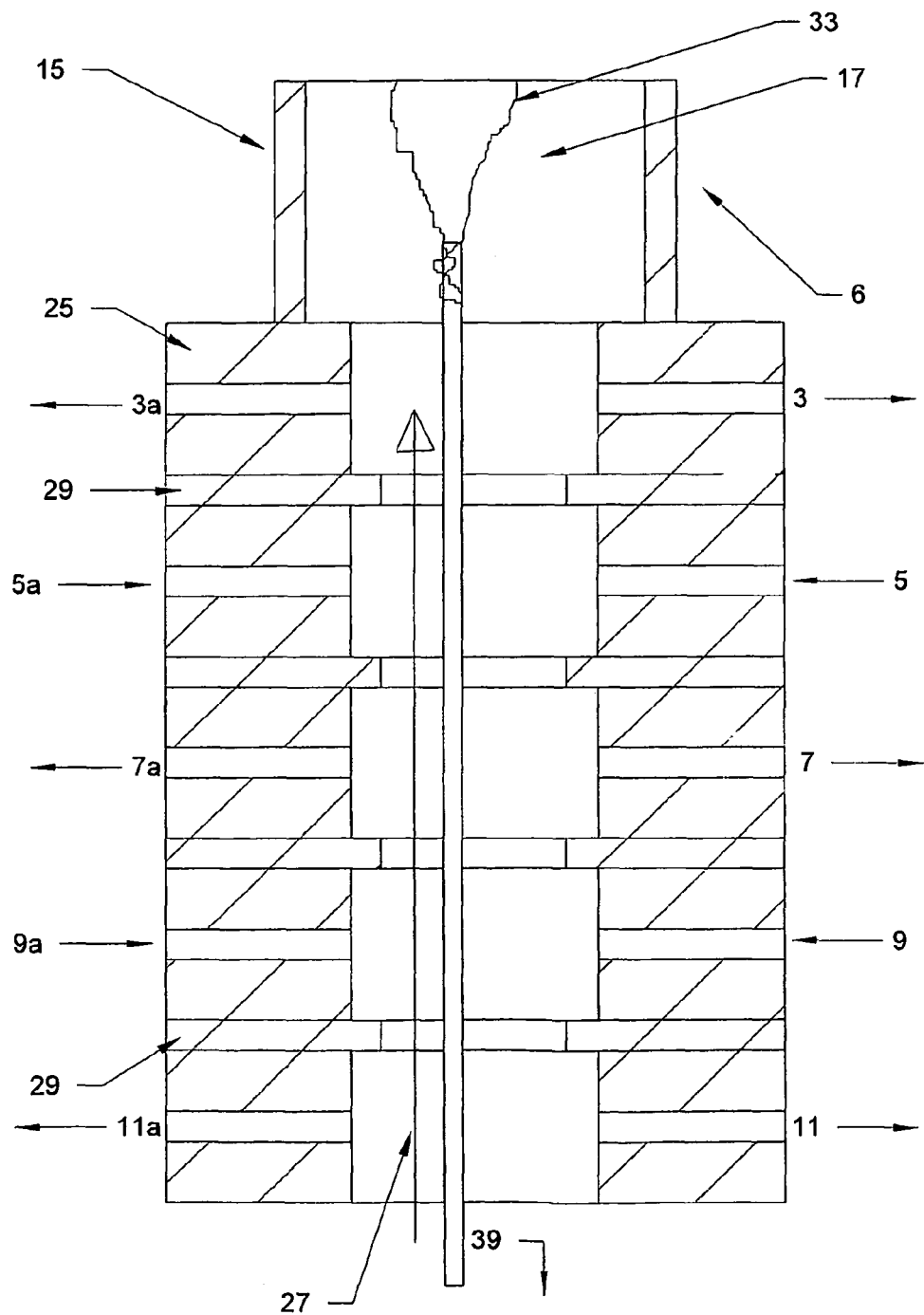

FIG. 3. Shows the gas blanket valve with the capture probe inserted.

Figure 4:
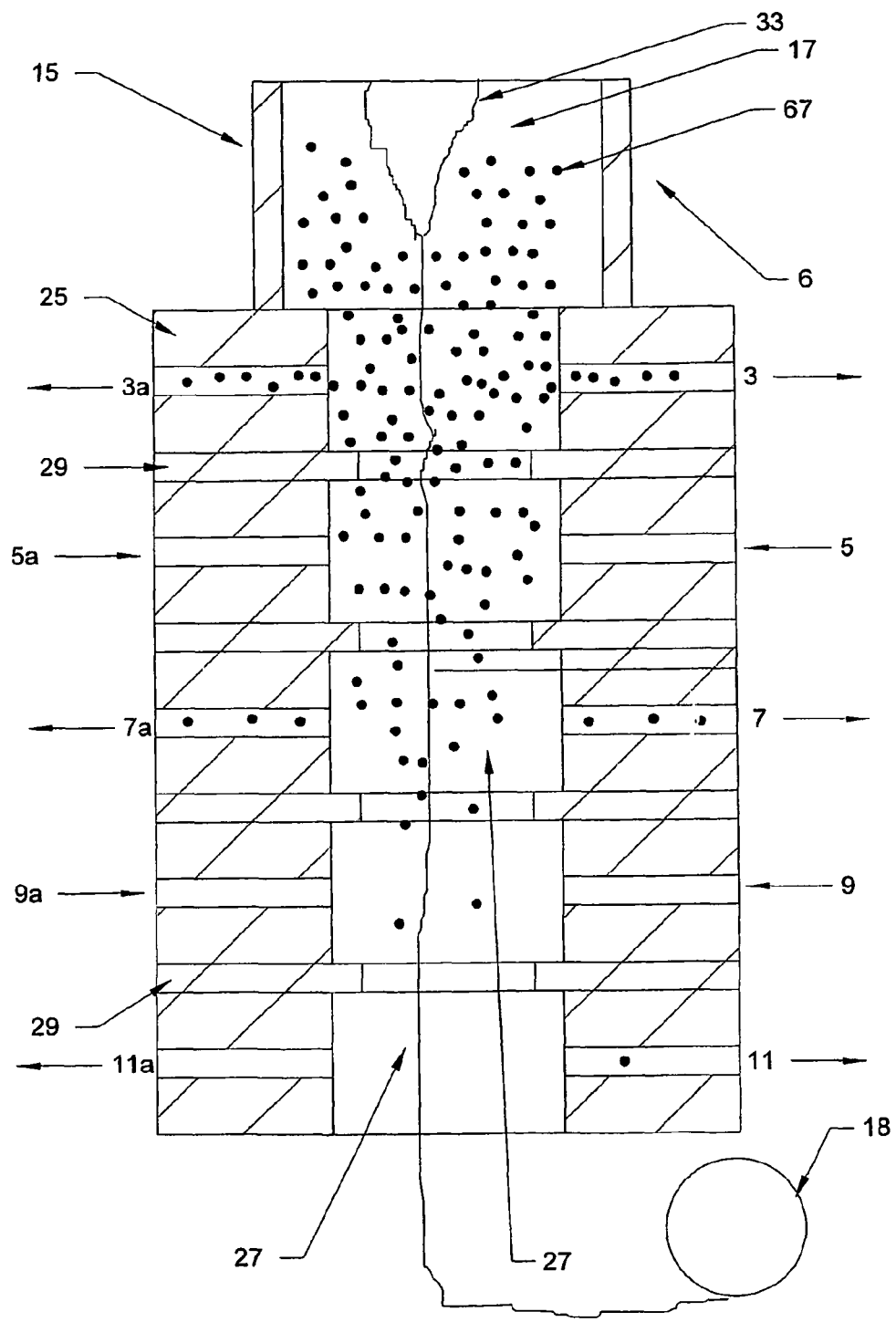

FIG. 4. Shows the gas blanket valve, the carbon nanotube sock, carbon nanotube fibre, winding spindle and the removal of the of reactive gases.

Figure 5:
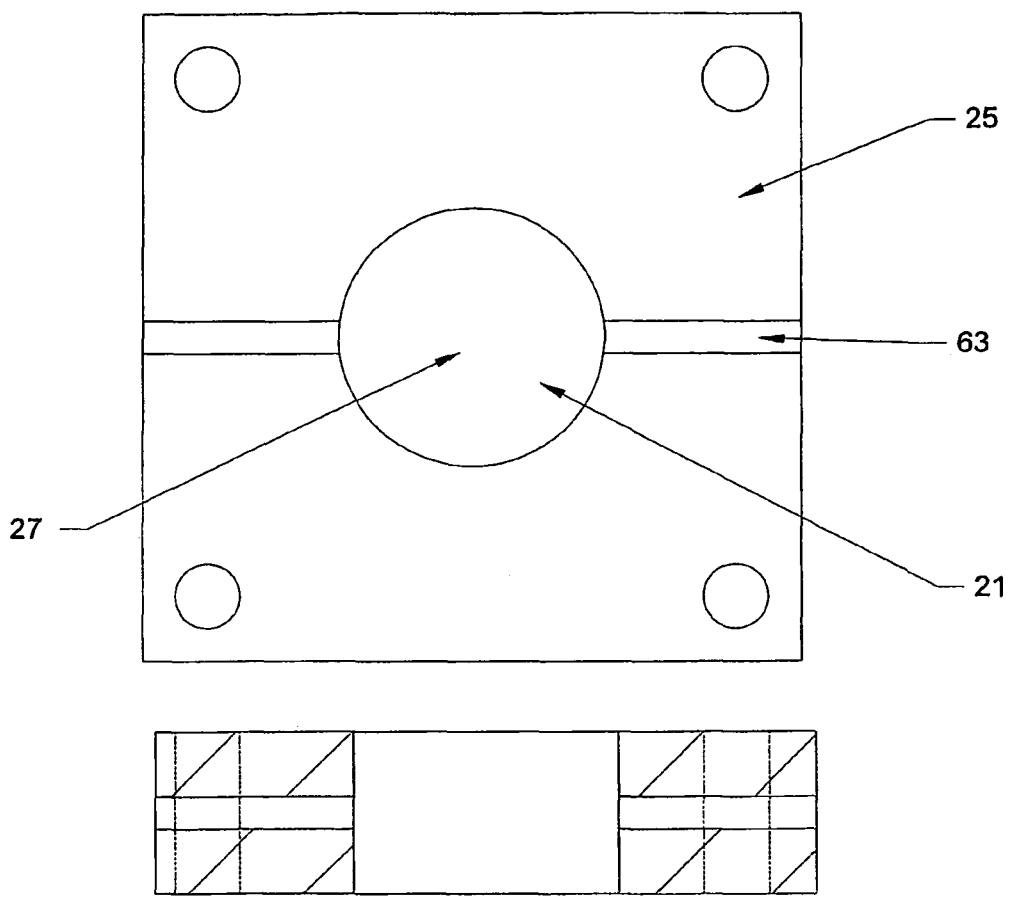

FIG. 5. Shows a single section of a stackable unit with orthogonal nozzles.

Figure 6:
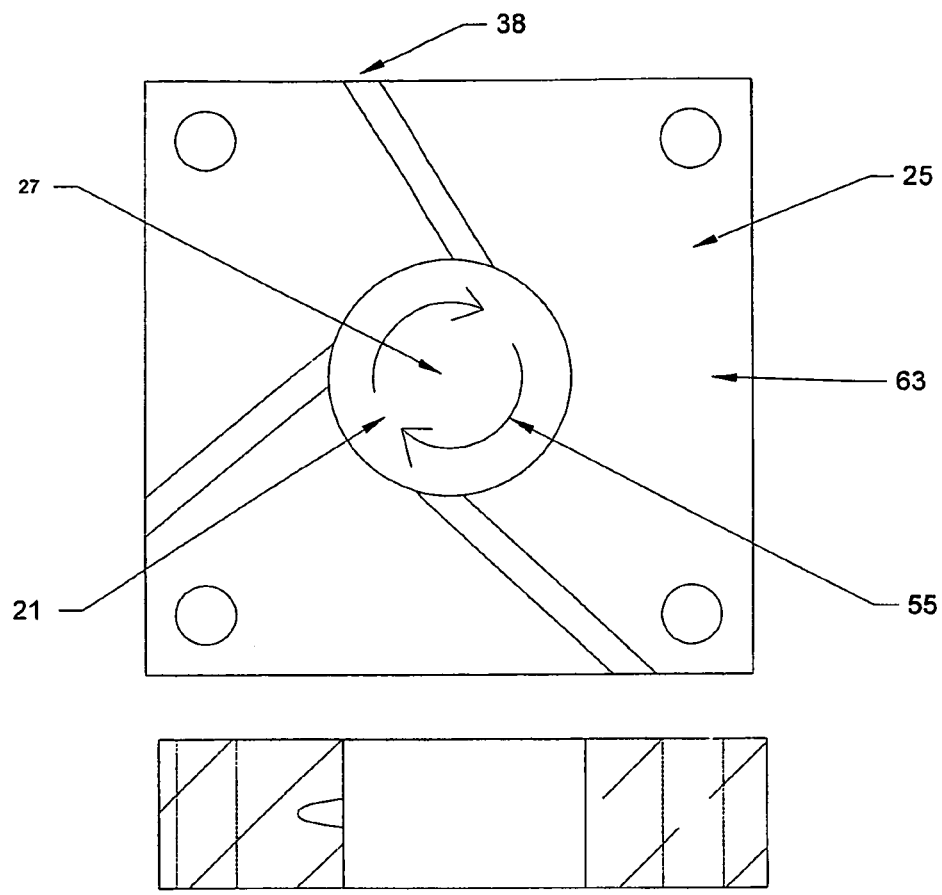

FIG. 6. Shows a single section of a stackable unit with angled nozzles and clockwise spinning gas.

Figure 7:
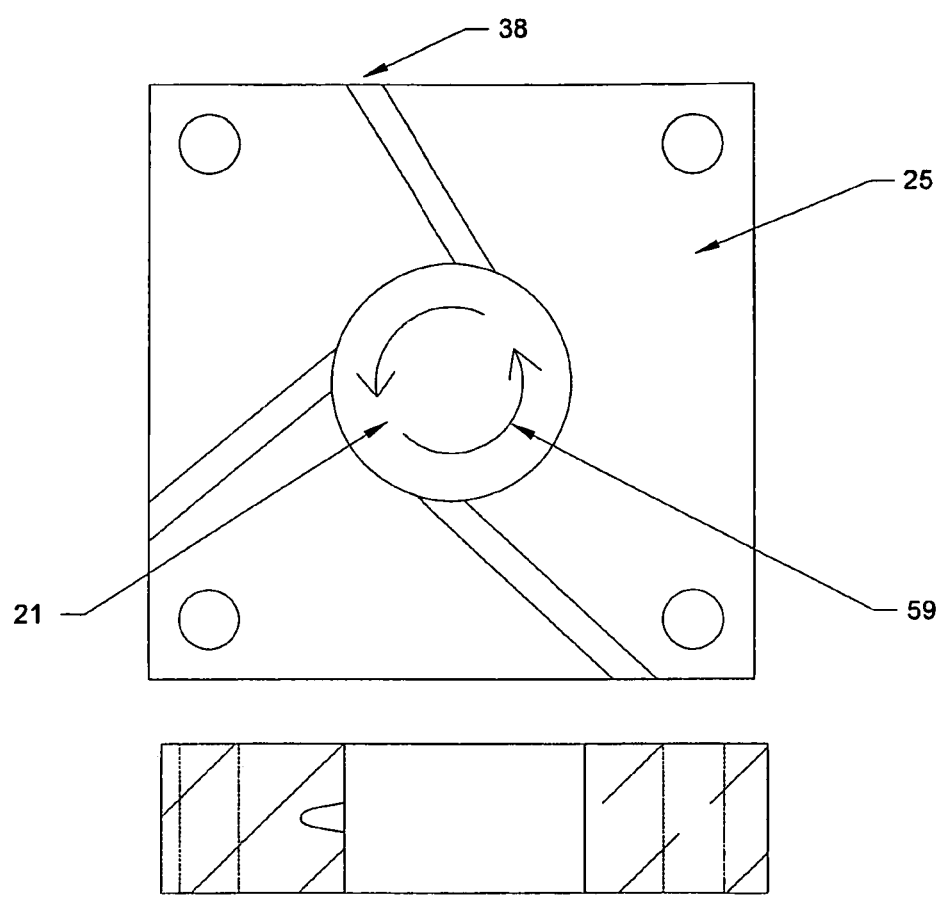

FIG. 7. Shows a single section of a stackable unit with angled nozzles and anticlockwise spinning gas.

Figure 8:
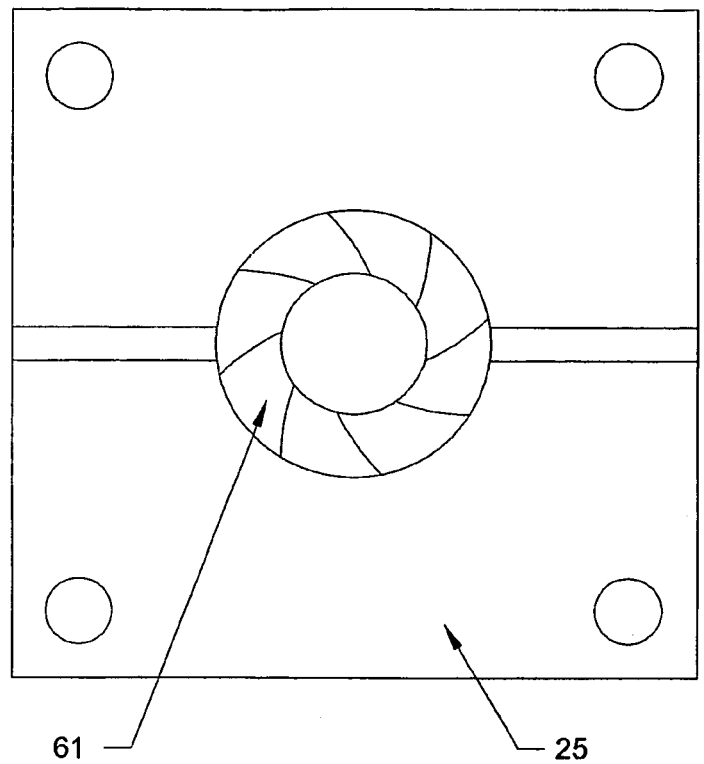

FIG. 8. Shows a single section of a stackable unit together with an included iris.

With Reference to FIG. 1.

Generally indicated at 1 is the gas blanket valve together with the high temperature reaction vessel indicated generally at 6, the wall of which is shown at 15, reaction space is shown at 17. Shown at 25 is a single section of the modular, stackable units shown generally at 4. The gas tight seals are shown at 29 and 29a respectively. Shown at 21 is a chamber formed with a single section of the stackable units. The stackable units can be constructed from metallic or non metallic materials as previously mentioned. The unimpeded channel is indicated at 27. It will be seen that no physical bather exists between the high temperature reaction vessel 6 with its reaction space 17 and the outside atmosphere indicated at 8.

Shown at 3 and 3a, 7 and 7a; 11 and 11a are the gas evacuation nozzles. Shown at 5 and 5a, 9 and 9a are the gas flushing input nozzles.

With Reference to FIG. 2.

Shown is an exploded view of the stackable units of the modular gas blanket valve. Shown generally at 31 are sections with a single section indicated at 25. The gas tight seals is shown at 29, 29a, 29b and 29c respectively. The unimpeded channel is indicated at 27. A chamber is shown at 21.

With Reference to FIG. 3.

Shown is the gas isolation blanket valve with flushing gas input and evacuation nozzles as previously identified. Shown at 33 is the carbon nanotube sock together with an extraction probe shown at 35. As the probe is removed from the reaction vessel through the unimpeded channel indicated at 27 it draws down carbon nanotube fibre such that it can be harvested outside the reaction vessel and the blanket valve. Reaction vessel wall is indicated at 15, reaction space is shown at 17.

With Reference to FIG. 4.

Shown generally at 12 is the gas blanket valve together with the reaction vessel, its wall is indicated at 15. Shown at 33 is the carbon nanotube sock with fibre indicated at 16. Shown at 18 is a wind up harvesting spindle. Reactive gases in the reaction vessel space indicated at 17 are shown at 67. Reactive gases can be seen being removed through the evacuation section nozzles indicated at 3 and 3a. Flushing gas in introduced via the adjacent chamber through its nozzles indicated at 5 and 5a. A further evacuation section with nozzles indicated at 7 and 7a remove more reactive gases. When further gas flushing and evacuation sections are added no reactive gases appear at the base of the blanket valve. Through the modular construction of the blanket valve sections can be added until sensors, not shown, indicate that no reactive gases are present at the base of the unimpeded extraction channel.

With Reference to FIG. 5.

Shown at 25 is a section of a modular unit with orthogonal nozzles indicated at 63. The section chamber is indicated at 21. The unimpeded channel is indicated at 27.

With Reference to FIG. 6.

Shown at 25 is a section of a modular unit with angled nozzles indicated at 38. Flushing gas can be seen spinning in a clockwise direction 55 when gas is introduced into chamber 21 through the nozzles 38.

With Reference to FIG. 7.

Shown at 25 is a section of a modular unit with angled nozzles indicated at 73. It will be noted that the angle of the nozzles places an anticlockwise spin 59 on the flushing gas introduced into chamber 21.

With Reference to FIG. 8.

Shown at 25 is a section of a modular unit with adjustable iris indicated at 61.

It will be noted that the diagrams are not to scale and although the described invention is primarily intended to facilitate the harvesting of carbon nanofibres through an unimpeded channel the invention can be applied to the harvesting of other products of a reaction where reactive gases and/or volatiles need to be removed during the harvesting process.

We claim:

1. A gas isolation valve that in use facilitates the harvesting of a product from a reaction vessel and to remove a member selected from the group consists of reactive gases, volatile gases, and reactive and volatile gases present in said reaction vessel during harvesting, comprising:

a chamber having a physical barrierless channel with a configuration which neither impedes nor inhibits the transfer of the product from said reaction vessel to atmosphere, wherein said chamber comprises a plurality of sections having evacuation sections having chamber evacuation nozzles, alternating with gas input sections having gas input nozzles, wherein each adjacent evacuation section and gas input section forms a discrete stackable unit of said plurality of sections assembled in modular form, and wherein a gas tight seal is provided between said adjacent evacuation section and said gas input section and between each of said discrete stackable units, whereby in use traces of the member selected from the group consisting of reactive gases, volatile gases, and reactive and volatile gases from said reaction vessel are diminished progressively by each of said discrete stackable units such that the member selected from the group consisting of reactive gases, volatile gases, and reactive and volatile gases are isolated from the atmosphere at a base of the gas isolation valve.

2. A gas isolation valve as claimed in claim 1, wherein said chamber has walls and said walls of said chamber are metallic.

3. A gas isolation valve as claimed in claim 1, wherein said chamber has walls and said walls of said chamber are non-metallic.

4. A gas isolation valve as claimed in claim 1, wherein said evacuation section has a wall and said chamber evacuation nozzles are placed at an angle in said evacuation section wall.

5. A gas isolation valve as claimed in claim 1, wherein one chamber evacuation nozzle is provided for said evacuation section.

6. A gas isolation valve as claimed in claim 1, wherein said gas input section has a wall and said gas input section is provided with gas input nozzles placed orthogonally in said gas input section wall.

7. A gas isolation valve as claimed in claim 1, wherein said gas input section has a wall and said gas input section is provided with gas input nozzles placed at an angle in said gas input section wall.

8. A gas isolation valve as claimed in claim 1, wherein an iris is provided for each of said evacuation and gas input sections.

9. A gas isolation valve as claimed in claim 1, wherein the product is extracted, unimpeded by a physical barrier.

10. A gas isolation valve as claimed in claim 1, wherein a kinetic energy gradient can be applied.

11. A gas isolation valve as claimed in claim 1, wherein a thermal gradient can be applied.

12. A gas isolation valve as claimed in claim 1, wherein an electric charge gradient can be applied.

13. A gas isolation valve as claimed in claim 1, wherein a wall of said chamber can be brought to zero potential.

14. A gas isolation valve as claimed in claim 1, wherein each alternate section can be brought to zero potential.

15. A gas isolation valve as claimed in claim 1, wherein gas spin can be applied within said chamber.

16. A gas isolation valve as claimed in claim 1, wherein an unimpeded extraction channel is provided.

17. A gas isolation valve as claimed in claim 16, wherein the product of said reaction vessel is extracted.

18. A gas isolation valve as claimed in claim 16, wherein carbon nanotube product is extracted.

19. A gas isolation valve as claimed in claim 16, wherein carbon nanotube fiber is extracted.

* * * * *